R. Murphy.

Rotary Churn.

No. 3,264. Reissued Jan. 12, 1869.

Witnesses:
J. W. Coombs
G. W. Reed

Inventor:
R. Murphy
per Munn & Co
Attys

N. PETERS, PHOTO-LITHOGRAPHER, WASHINGTON, D. C.

United States Patent Office.

ROBERT MURPHY, OF JASPER, NEW YORK.

*Letters Patent No.* 43,423, *dated July* 5, 1864; *reissue No.* 3,264, *dated January* 12, 1869.

IMPROVEMENT IN CHURNS.

The Schedule referred to in these Letters Patent and making part of the same.

*To all whom it may concern:*

Be it known that I, ROBERT MURPHY, of Jasper, in the county of Steuben, and State of New York, have invented a new and useful Improvement in Churns; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention consists in suspending a barrel-shaped cream-receptacle on transverse trunnions, in a suitable framing, in combination with the application of weights or counterpoises to the receptacle, for the purpose of acting as a fly-wheel, and, by their momentum, insuring a uniform or steady rotation of the receptacle, as hereinafter described.

It also consists in the construction of the cover of the barrel-churn, and in attaching and securing the same to the body by means of a hoop, which not only serves to hold the staves of the barrel in place, but also forms a flange fitting over the lower edge of the cover, or, in other words, a recess into which the cover fits, for the purpose of making the joint perfectly tight during the operation of the churn.

A represents a barrel-shaped cream-receptacle, provided with a journal or trunnion, *a*, at two opposite points at its centre, said journals or trunnions being fitted in bearings *b* on a framing, B.

One of these journals or trunnions *a* is provided with a crank, *c*, for the purpose of turning the receptacle.

The cream-receptacle is provided with an arm, *d*, at two opposite points, said arms being in a plane at right angles to the plane of the journals or trunnions *a a*.

Figure 1:
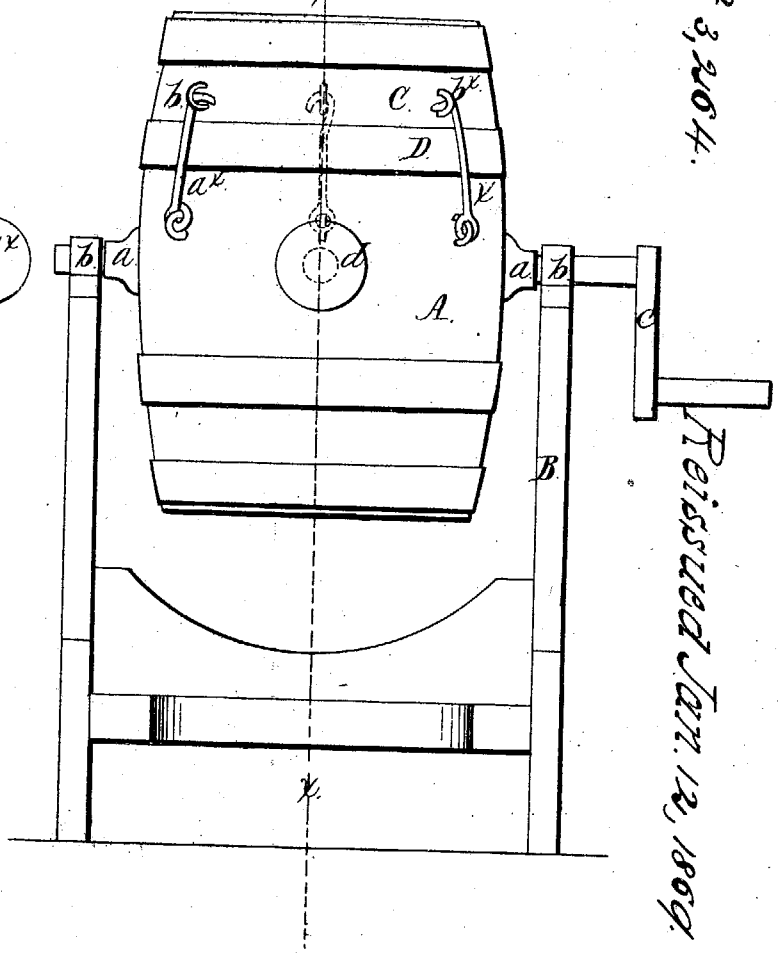
Figure 1 is an external view of my invention.
Figure 2:
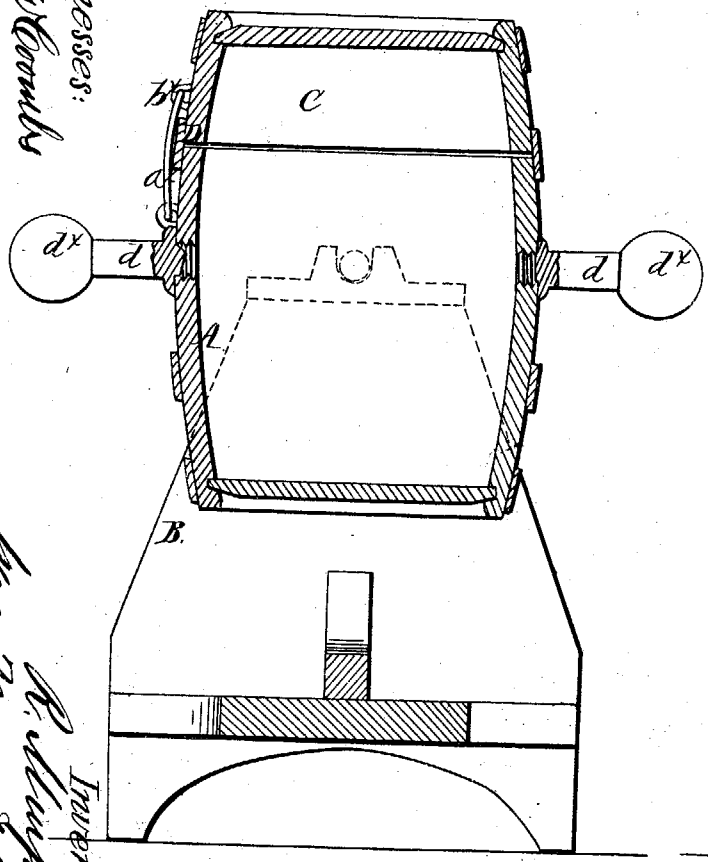
Figure 2 is a vertical central section of my invention, taken in the line *x x*, fig. 1.

These arms have a weight or counterpoise, $d^{\times}$, at their outer ends, which serve to keep the receptacle in a state of equipoise, and insure a steady or uniform rotation of the same by compensating for the elongated shape of the receptacle, as will be plainly understood by referring to fig. 2.

The receptacle A is divided circumferentially about one-third the distance from one end of it, to form a lid, C.

This lid is fitted within a hoop, D, which encompasses the receptacle, one half of the hoop being on the main portion of the receptacle, and the other half encompassing the lid, as shown clearly in fig. 2.

The lid is firmly secured to the body or main portion of the receptacle by means of hooks $a^{\times}$ and staples $b^{\times}$, as shown in both figures.

The butter is produced very expeditiously by rotating the receptacle A, the elongated form of the latter, in connection with its revolving movement, producing the necessary agitation of the cream to effect that result.

Having thus described my invention,

I claim as new, and desire to secure by Letters Patent—

1. A barrel-churn, A, rotated upon transverse trunnions *a a*, and provided with counterpoises $d^{\times}$ $d^{\times}$, the whole being arranged to operate in the manner and for the purpose set forth.

2. Constructing, attaching, and securing the cover to the barrel-churn herein described, as specified.

The above specification of my invention signed by me, this 22d day of July, 1868.

ROBERT MURPHY.

Witnesses:

J. F. BROOKS,
J. S. OUTMAN.